Patented Aug. 10, 1937

2,089,348

UNITED STATES PATENT OFFICE 2,089,348

PROCESS FOR THE MANUFACTURE OF AMINO SULPHONIC ACIDS

Arnold Doser, Rudolf Schröter, and Otto Bayer, Leverkusen, Germany, assignors to I. G. Farbenindustrie Aktiengesellschaft, Frankfort-on-the-Main, Germany No Drawing. Application February 10, 1936, Serial No. 63,264. In Germany February 9, 1935

7 Claims. (Cl. 260—127)

(Granted under the provisions of sec. 14, act of March 2, 1927; 357 O. G. 5)

This invention relates to a new process for the manufacture of amino sulphonic acids.

It is known that the amino sulphonic acids of the low molecular as well as of the high molecular type are valuable industrial products which on the one hand serve as intermediate compounds for further reactions and, on the other hand, can be used as such for various purposes, for instance, as assisting agents in the textile and allied industries. Such amino sulphonic acids have hitherto been prepared, for example, by causing halogen or hydroxy sulphonic acids to react with ammonia or suitable amines. These known reactions are performed at elevated temperatures and they require a relatively long time; moreover, the employment of at least 2 molecular quantities of ammonia or an amine on each molecular quantity of sulphonic acid is necessary. The reaction products obtained in this manner still contain unreacted amine which in many cases must be removed by a special purifying process in order to render the product suitable for use.

It is the purpose of our invention to furnish an improved process for the manufacture of amino sulphonic acids both of the low and of the high molecular type, thereby obtaining the said amino sulphonic acids in a better yield and at once in a sufficiently pure state for further reactions or for direct application. Thus our new process comprises the steps of condensing ammonia or a primary amine with an aldehyde or ketone sulphonic acid or a water soluble salt thereof and reducing the condensation product thereof.

For carrying out the process of our invention, as initial materials there may be used, for instance, ammonia or primary amines like methylamine, ethylamine, butylamine, aniline, hexahydroaniline, benzylamine, ethylenediamine, $\beta$-$\beta'$-diamino diethyl ether, polyalkylenepolyamines, substituted polyamines still containing primary amino groups, higher amines, such as dodecylamine, octadecylamine or octadecyleneamine, the amines corresponding in structure to the resin and naphthenic acids, or technical mixtures of higher amines.

On the other hand, the following carbonyl sulphonic acids may be instanced as examples: acetaldehyde sulphonic acid, propion aldehyde sulphonic acid, butyraldehyde sulphonic acid, benzaldehyde sulphonic acids, acetone sulphonic acid, methylethylketone sulphonic acid, cyclohexanone sulphonic acid, N-methyl-oxopropyl-taurine $(CH_3—CO—CH_2—NCH_3—CH_2—CH_2—SO_3H)$ oxopropyl sulphoethyl sulphide $(CH_3—CO—CH_2—S—CH_2—CH_2—SO_3H)$ or a product of the formula $HOOC—CH_2—NCH_3—CH_2—CO—$
$\phantom{HOOC—CH_2—NCH_3—}CH_2—NCH_3—CH_2—CH_2—SO_3H$ and the like.

Our new process may be performed either in two steps by initially condensing a carbonyl sulphonic acid with ammonia or a primary amine and then reducing the condensation product; preferably, however, condensation and reduction are carried out at the same time.

In carrying out the process of our invention, the condensation may be performed in an aqueous or aqueous/organic medium, the reaction being accelerated by heating. The components may be employed in equimolar quantities; however, if ammonia or an easily volatile amine is employed, it is preferable to use an excess of the said compounds. The reduction of the condensation product thus obtained may be performed in accordance with known methods, for example, by means of sodium amalgam in an acid medium. The catalytic reduction by means of activated hydrogen has proved to be particularly advantageous. This catalytic hydrogenation is performed with suitable catalysts, for example, nickel or copper compounds. In order to perform the condensation and the catalytic hydrogenation at the same time, the necessary quantity of the catalyst is incorporated with the mixture of the condensation components, the whole being then subjected to a hydrogen pressure of about 10 to 100 atmospheres in an autoclave, and heated until the consumption of hydrogen ceases.

The low molecular amino sulphonic acids obtainable in accordance with the present invention, may be employed as such or as intermediate products; as they contain at least one primary or secondary amino group, they are capable of numerous further reactions. Thus, for example, they may be condensed with high molecular organic acids in the known manner to form valuable textile, dyeing or tanning assistants. By condensing low molecular amino sulphonic acids prepared from ketosulphonic acids with higher fatty acids, valuable washing agents for wool and cotton are obtained.

On the other hand, the high molecular amino sulphonic acids which are also obtainable in accordance with our present process may be employed in the various processes of working up and improving textiles, leather and like materials, for instance for washing, wetting, bucking, bleaching, drumming, dyeing with vat, naphthol, sulphur or diazo dyestuffs, after treating or stripping of dyeings, preparing of emulsions of fats, oils, fatty acids, waxes, wax-like substances, paraffin wax, sizing, impregnating, dressing, finishing and the like.

In these processes, the high molecular amino sulphonic acids or the above mentioned condensation products of low molecular amino sulphonic acids may be employed alone, in mixture with each other and/or in conjunction with other auxiliary agents for the textile, leather and like industries such, for instance, as soaps, Turkey red oils, alkylnaphthalene sulphonic acids, condensation products of carboxylic acids of high molecular weight with hydroxy alkyl sulphonic acids, sulphonates of fatty alcohols, glue, soluble protein material for degradation products thereof, starch, soluble gums, vegetable mucilages, alcohols, ketones, hydrocarbons, halogenated hydrocarbons and the like.

The following examples illustrate the invention without limiting it thereto, the parts being by weight:

Example 1

80 parts of the sodium salt of acetone sulphonic acid, 100 parts of 18% aqueous solution of ammonia and 20 parts of a catalyst consisting of previously reduced nickel-copper oxide are treated with hydrogen at 90–120° C. and 30 atmospheres until saturation is reached. After removal of the catalyst and evaporation to dryness, 84 parts of about 90% β-amino propane sulphonic acid sodium salt are obtained.

The solution obtained after the reduction may, after filtration and removing the excess ammonia, be used immediately in the manufacture of textile assistants for instance by condensing with oleic acid chloride.

The products so obtainable are good washing agents for wool and cotton in neutral baths and also in baths containing sodium carbonate.

If, instead of oleic acid chloride, an equivalent amount of coconut fatty acid chloride is employed, a product is obtained the aqueous solutions of which foam strongly.

Example 2

80 parts of the sodium salt of acetone sulphonic acid, 200 parts of a 28% solution of methylamine in methyl alcohol and 20 parts of a hydrogenation catalyst obtained by precipitating nickel carbonate on fuller's earth, are shaken at a hydrogen pressure of 50 atmospheres at 70–100° C. When the reaction is complete, the mixture is filtered. The solvent is then evaporated. 94 parts of the crude sodium salt of β-methylamino propane sulphonic acid are obtained. The product is suitable for the stabilization of diazo compounds.

Example 3

18 parts of dodecyl amine and 20 parts of the sodium salt of acetone sulphonic acid are heated in 100 parts of 96% ethyl alcohol until a clear solution is obtained. On cooling, the condensation product crystallizes out. The product is water-soluble. It is decomposed by the action of dilute acids.

The condensation product is introduced into 45 parts of an aqueous solution of methyl alcohol and treated with hydrogen at 90–100° C. under a pressure of 10 atmospheres in the presence of a catalyst, as described in Example 1 until saturation is reached. After removal of the catalyst and evaporation to dryness a product is obtained which is water-soluble and stable towards acids and alkalies. It can be recrystallized from ethyl alcohol. The product obtained is the β-dodecylamino propane sulphonic acid sodium salt. It exhibits an excellent washing power for wool and cotton. The aqueous solutions thereof foam strongly.

On treating the sodium salt of dodecyliminopropane sulphonic acid (obtained from the sodium salt of acetone sulphonic acid and dodecyl amine in the 8-fold quantity of butyl alcohol) with sodium or sodium amalgam at boiling temperature, the fastness to boiling of diluted aqueous solutions of the product steadily increases. The reduction product obtainable in this way is not split by diluted acids and represents the sodium salt of dodecyl amino propane sulphonic acid.

Example 4

40 parts of the sodium salt of acetone sulphonic acid and 46 parts of dodecylamine are introduced into 300 parts of methyl alcohol and treated with hydrogen at 100–120° C. under a pressure of 20 atmospheres in the presence of 10 parts of a catalyst as described in Example 2. After removal of the catalyst and evaporation of the methyl alcohol a product is obtained which exhibits the same properties as the sulphonic acid obtained according to Example 3.

Example 5

A suspension in aqueous methyl alcohol of equimolar quantities of the sodium salt of acetone sulphonic acid and octadecylamine is treated with hydrogen at 60–80° C. under a pressure of 20–30 atmospheres in the presence of a nickel catalyst according to Example 2. By evaporation of the hot filtered solution the sodium salt of β-octadecylamino propane sulphonic acid is obtained. It can easily be purified by recrystallization from aqueous ethyl alcohol. It displays a good dispersing power for calcium soaps and vat dyestuffs.

Example 6

50 parts of butyraldehyde-3-sulphonic acid and 300 parts of a 17.5% solution of ammonia in methyl alcohol are stirred at 60–80° C. under a hydrogen pressure of 100 atmospheres in the presence of a previously reduced nickel-copperoxide catalyst until saturation is achieved. After removal of the catalyst and evaporation to dryness, a brittle, light-yellow resin is obtained. If the resin is dissolved in hot glacial acetic acid, and about the same quantity of ethyl alcohol is added, the 1-amino-butane-3-sulphonic acid crystallizes out on cooling.

For many purposes, for example for the manufacture of washing agents, the solution obtained in the reduction process can after filtering and removing the excess ammonia, immediately be used for condensation, for example, with oleic acid chloride.

Example 7

66 parts of benzaldehyde-2-sulphonic acid, 50 parts of n-butylamine, 100 parts of methyl alcohol, 100 parts of water, and 20 parts of catalyst according to Example 2, are stirred at 100–135° C. in an autoclave under a hydrogen pressure of 50 atmospheres until no further hydrogen is consumed. After removal of the catalyst the solution is evaporated to dryness at low pressure. If the hygroscopic product obtained is dissolved in hot glacial acetic acid, and 3–4 times the quantity of acetone is added, the butyl benzylamino-2-sulphonic acid crystallizes out after allowing the solution to cool. The sulphonic acid obtained can be recrystallized with the aid of water.

Example 8

87 parts of 2-butanone-1-sulphonic acid sodium, 50 parts of water, 250 parts of a 17,5% solution of ammonia in methyl alcohol, 10 parts of a silica gel catalyst are subjected to a hydrogen pressure of 40–50 atmospheres at 80–100° C. After removal of the catalyst, the filtrate is evaporated to dryness. The residue contains 80% of the sodium salt of the 2-aminobutane-1-sulphonic acid. A concentrated solution of the sodium salt is strongly alkaline to phenol phthalein. The free sulphonic acid can be obtained by pasting the dried crude sodium salt in the cold with concentrated hydrochloric acid, removing the sodium chloride separated by filtration with suction, and evaporation to dryness in vacuo of the hydrochloric acid solution. The free sulphonic acid can be recrystallized by means of aqueous ethyl alcohol.

The condensation product of the sulphonic acid obtained and oleic acid chloride is an excellent washing agent for wool and cotton.

Example 9

87 parts of 2-butanone-3-sulphonic acid sodium are condensed and hydrogenated as described in Example 8, the catalyst being a nickel fuller's earth contact. The solution is separated from the catalyst and strongly evaporated. The sodium salt of the 2-aminobutane-3-sulphonic acid is separated thereby. By evaporation to dryness of the solution of the sodium salt and then warming with glacial acetic acid, the free sulphonic acid can be obtained. The residue, which is thus brought into solution, is then suddenly separated as a crystal magma. The free 2-aminobutane-3-sulphonic acid so obtained can easily be recrystallized by means of 70% aqueous ethyl alcohol.

The formation of the 2-aminobutane-3-sulphonic acid from 2-butanone-3-sulphonic acid sodium, ammonia and hydrogen is almost quantitive, so that the crude product, after removal of the catalyst and the excess ammonia, can immediately be used for the preparation of textile assistants, for instance, for the manufacture of washing agents for wool and cotton.

Example 10

94 parts of 3-pentanone-2-sulphonic acid sodium are treated with ammonia and hydrogen in an analogous manner to Example 9. The 3-aminopentan1-2-sulphonic acid sodium is obtained in an almost quantitive yield. It can be isolated by removing the catalyst and dissolving the dried crude product in hot butylalcohol. On the addition of acetone, the sodium salt crystallizes out after some time.

The product yields derivatives which are distinguished by their particular properties as to solubility. For example, the 3-oleylamino pentane-2-sulphonic acid sodium, which is an excellent washing agent for wool and cotton, is readily soluble in benzene and, therefore, suitable as a solvent-soap.

Example 11

58 parts of camphor sulphonic acid are dissolved in 300 parts of a solution of ammonia in methyl alcohol, and treated with hydrogen at 120–125° C. under a pressure of 30–50 atmospheres in the presence of a nickel catalyst. The catalyst is removed, the solution evaporated to dryness, the residue dissolved in glacial acetic acid. To the solution so obtained acetic acid ethyl ester is added. After prolonged standing, the bornylamine sulphonic acid crystallizes out. It can be recrystallized from a mixture of ethyl alcohol and acetic acid ethyl ester.

Example 12

100 parts of a 66% benzaldehyde-o-sulphonic acid, 35 parts of aniline, 200 parts of methyl alcohol are condensed and hydrogenated as described in Example 7. After filtering the reaction product is evaporated at low pressure to dryness. The product is recrystallized from about 90% ethyl alcohol. The sodium salt of o-sulphobenzylaniline, crystallizing in needles, is obtained.

Example 13

100 parts of a 66% benzaldehyde-o-sulphonic acid, 60 parts of hexahydroaniline, 200 parts of methyl alcohol and 20 parts of nickel-cobalt-catalyst on fuller's earth are treated at a hydrogen pressure of 100 atmospheres at 100–130° C. until no more hydrogen is taken up. After cooling the product is filtered off and the filtrate is evaporated at low pressure to dryness, and taken up with water. By the addition of an acid the o-sulphobenzylcyclohexylamine is precipitated.

Example 14

80 parts of the sodium salt of acetone sulphonic acid, 104 parts of benzylamine and 200 parts of 75% methylalcohol are condensed and hydrogenated as described in Example 9. The filtered solution is evaporated to dryness at low pressure. The product is dissolved in water and the benzylaminopropane sulphonic acid is precipitated therefrom by acidifying.

We claim:—

1. Process for the manufacture of amino sulphonic acids which comprises causing a nitrogen base selected from the group consisting of ammonia and primary amines to react with a compound containing the group

being selected from the group consisting of aldehyde- and ketone-sulphonic acids and the water soluble salts thereof, and reducing the reaction product thus obtained.

2. Process for the manufacture of amino sulphonic acids which comprises causing a nitrogen base selected from the group consisting of ammonia and primary amines to react with a compound containing the group

being selected from the group consisting of aldehyde- and ketone-sulphonic acids and the water soluble salts thereof and reducing the reaction product thus obtained catalytically with hydrogen.

3. Process for the manufacture of amino sulphonic acids which comprises causing a nitrogen base selected from the group consisting of ammonia and primary amines to react with a compound containing the group

being selected from the group consisting of aldehyde- and ketone-sulphonic acids and the water soluble salts thereof and simultaneously reducing the reaction product thus obtained catalytically with hydrogen.

4. Process for the manufacture of amino sulphonic acids which comprises causing ammonia to react with a compound containing the group

being selected from the group consisting of aldehyde- and ketone-sulphonic acids and the water soluble salts thereof and simultaneously reducing the reaction product thus obtained catalytically with hydrogen.

5. Process for the manufacture of amino sulphonic acids which comprises causing a primary amine of more than 8 carbon atoms to react with a compound containing the group

being selected from the group consisting of aldehyde- and ketone-sulphonic acids and the water soluble salts thereof and simultaneously reducing the reaction product thereof catalytically with hydrogen.

6. Process for the manufacture of amino sulphonic acids which comprises causing a high molecular aliphatic primary amine containing from 12 to 18 carbon atoms with acetone sulphonic acid and simultaneously reducing the reaction product thereof catalytically with hydrogen.

7. Process for the manufacture of an amino sulphonic acid which comprises causing ammonia to react with acetone sulphonic acid and simultaneously reducing the reaction product catalytically with hydrogen.

ARNOLD DOSER.
RUDOLF SCHRÖTER.
OTTO BAYER.